(12) United States Patent
Ali et al.

(10) Patent No.: US 8,753,206 B2
(45) Date of Patent: Jun. 17, 2014

(54) GAME CONTROLLER SYSTEM

(76) Inventors: Darren Ali, Devon (CA); Ken Dornbusch, Maple Ridge (CA)

(*) Notice: Subject to any disclaimer, the term of this patent is extended or adjusted under 35 U.S.C. 154(b) by 306 days.

(21) Appl. No.: 13/208,914

(22) Filed: Aug. 12, 2011

(65) Prior Publication Data

US 2013/0040736 A1 Feb. 14, 2013

(51) Int. Cl.
*A63F 9/24* (2006.01)
(52) U.S. Cl.
USPC .................................. 463/37; 463/31
(58) Field of Classification Search
USPC ....................................... 463/37, 31
See application file for complete search history.

(56) References Cited

U.S. PATENT DOCUMENTS

| | | | |
|---|---|---|---|
| 8,576,199 B1* | 11/2013 | Pryor | 345/175 |
| 2001/0012801 A1* | 8/2001 | Komata | 463/37 |
| 2009/0233671 A1* | 9/2009 | Tsukahara | 463/6 |
| 2013/0077675 A1* | 3/2013 | Rosen et al. | 375/240.03 |

* cited by examiner

*Primary Examiner* — Pierre E Elisca
(74) *Attorney, Agent, or Firm* — Bennett Jones LLP

(57) ABSTRACT

A rapid fire game controller which is configured to be operatively connected to a video game includes a rapid fire shot rate component; a shot rate preset component, and a display for showing a user information about rapid fire rate and preset selection.

7 Claims, 4 Drawing Sheets

Setting Preset for Shot Per Second Storage Location

Setting Fire Rate in Shots Per Second

Setting Preset for Shot Per Second Storage Location

GAME CONTROLLER SYSTEM

FIELD OF THE INVENTION

The present invention is directed to a game controller, and in particular, a game controller with user controlled parameters for rapid fire use.

BACKGROUND

Many video games are shooter games, where the player controls a gun or other projectile weapon, and the object of the game includes targeted shooting. In a first person shooter game, the game shows the action from the visual perspective of the character being controlled by the player. In a third person shooter game, the player character is shown at a distance.

Many shooter games have evolved to be played online, against known or unknown players over the Internet. These games have become very competitive, and there is always the desire to be better, and to gain any competitive edge possible.

Many game controllers may be modified to be "rapid fire" controllers. As the name suggests, the modification permits a significant increase in the rate of firing of the weapon, which may of course provide a significant advantage in game play.

While stock controllers provided with such game consoles such as Playstation 3 (PS3) or Xbox™ do not have rapid fire capability, numerous off-the-shelf modifications are commercially available to convert the stock controller into a rapid fire controller. The modification typically involves a hardware upgrade which involves disassembly and reassembly of the controller with replacement of controller chips.

There remains a need in the art for a controller which has rapid fire capability, but with user controllable parameters that can optimize the controller for various games and scenarios, preferably in a user-friendly and intuitive control scheme.

SUMMARY OF THE INVENTION

In one aspect, the invention comprises a game controller which has, or has been modified to have, rapid fire capability. The controller comprises rapid fire module which comprises a shot rate adjustment component and a multiple preset component, and a display.

In another aspect, the invention comprises a modification kit which comprises a rapid fire module which comprises a shot rate adjustment component and a multiple preset component, and a display, which kit may be used to modify a game controller.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF PREFERRED EMBODIMENTS

The invention relates to a game controller with user-controllable rapid fire capability. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

As used herein, the term "rapid fire" means the ability to shoot at an appreciably faster rate than a "stock" (standard unmodified) game controller for any given game. Although rapid fire game controllers are conventionally made by modifying standard game controllers, it is possible that game console manufacturers may build in such capability to the stock controller, which would still be considered a rapid fire controller for the purposes of the present invention.

In one embodiment, the invention comprises a rapid fire game controller (10) with a shot rate adjustment component, a user preset component, and a display (12). The game controller may be adapted to be operatively connected to any game console, such as Xbox™, Playstation™, Nintendo™, as is well known in the art. The game controller may also be adapted to be operatively connected to a game being played on a general purpose computer or a handheld portable gaming device.

In one aspect, the invention may comprise a modification kit comprising a rapid fire module which comprises a shot rate adjustment component and a multiple preset component, and a display, which kit may be used to modify an existing game controller.

Figure 1:
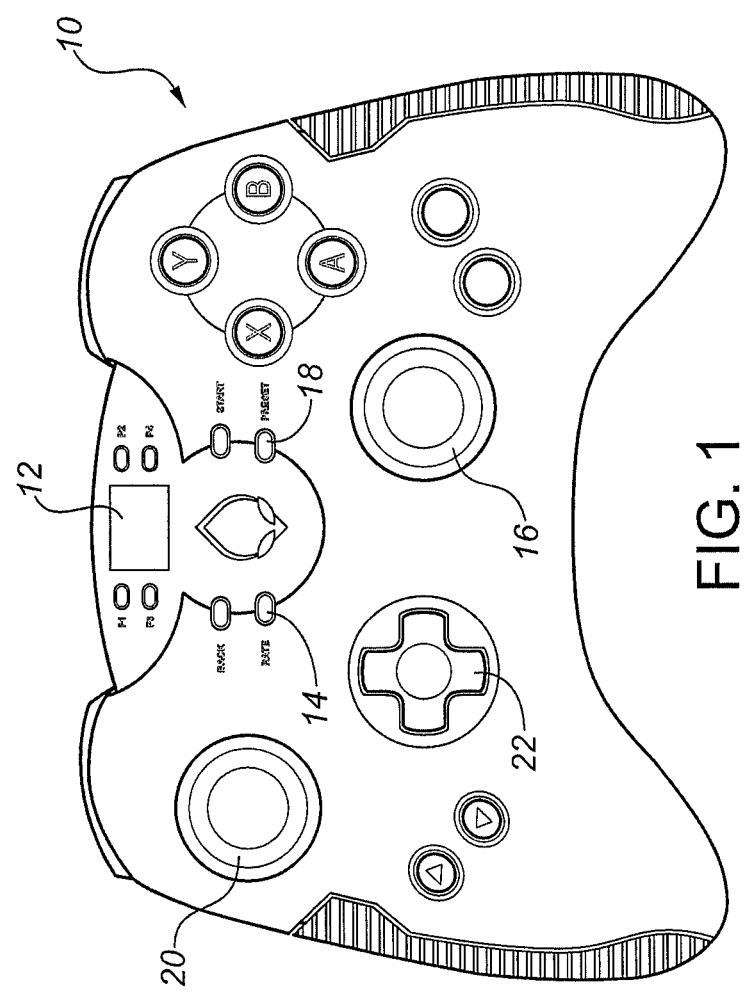
FIG. 1 shows a game controller of the present invention.

The shot rate adjustment component allows the user to adjust or set the shot rate (typically expressed as shots per minute or shots per second) to a desired level. For example, the component may permit the user to select any shot rate between 1 shot per second, and 100 shots per second. The currently selected shot rate will display in the LED display (12) on the controller shown in FIG. 1.

Figure 2:
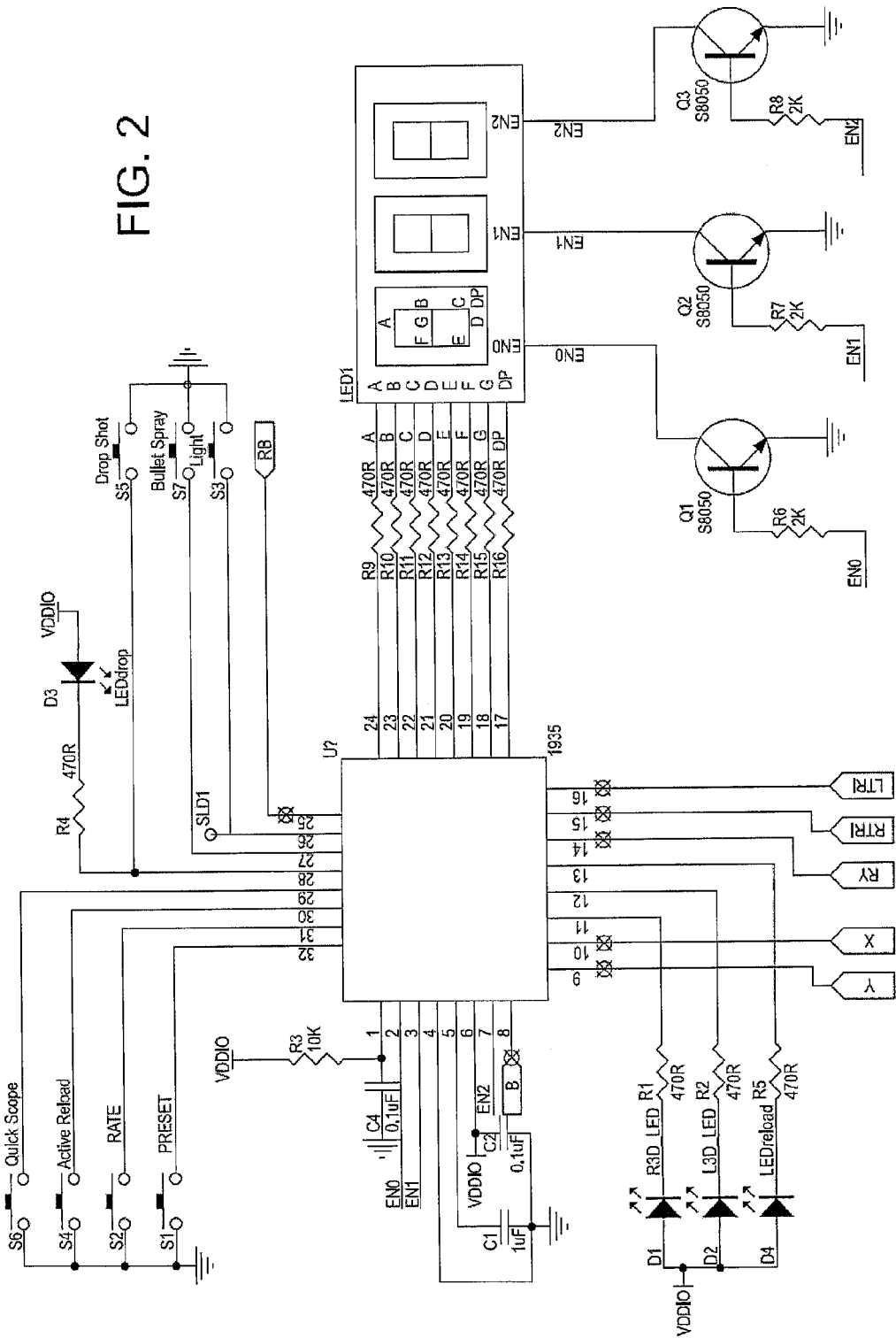
FIG. 2 shows a schematic of a hardware component configured to implement the methods of one embodiment of the invention.

The shot rate adjustment component and the user preset component may be implemented in the controller in firmware, software, hardware, or combinations thereof. In one embodiment, as shown schematically in FIG. 2, the components are embedded in a chip which is configured to replace the chip provided in the stock controller, to duplicate the functionality of the stock controller, but with added rapid fire capability, and with the shot rate adjustment component and the user preset component.

Figure 3:
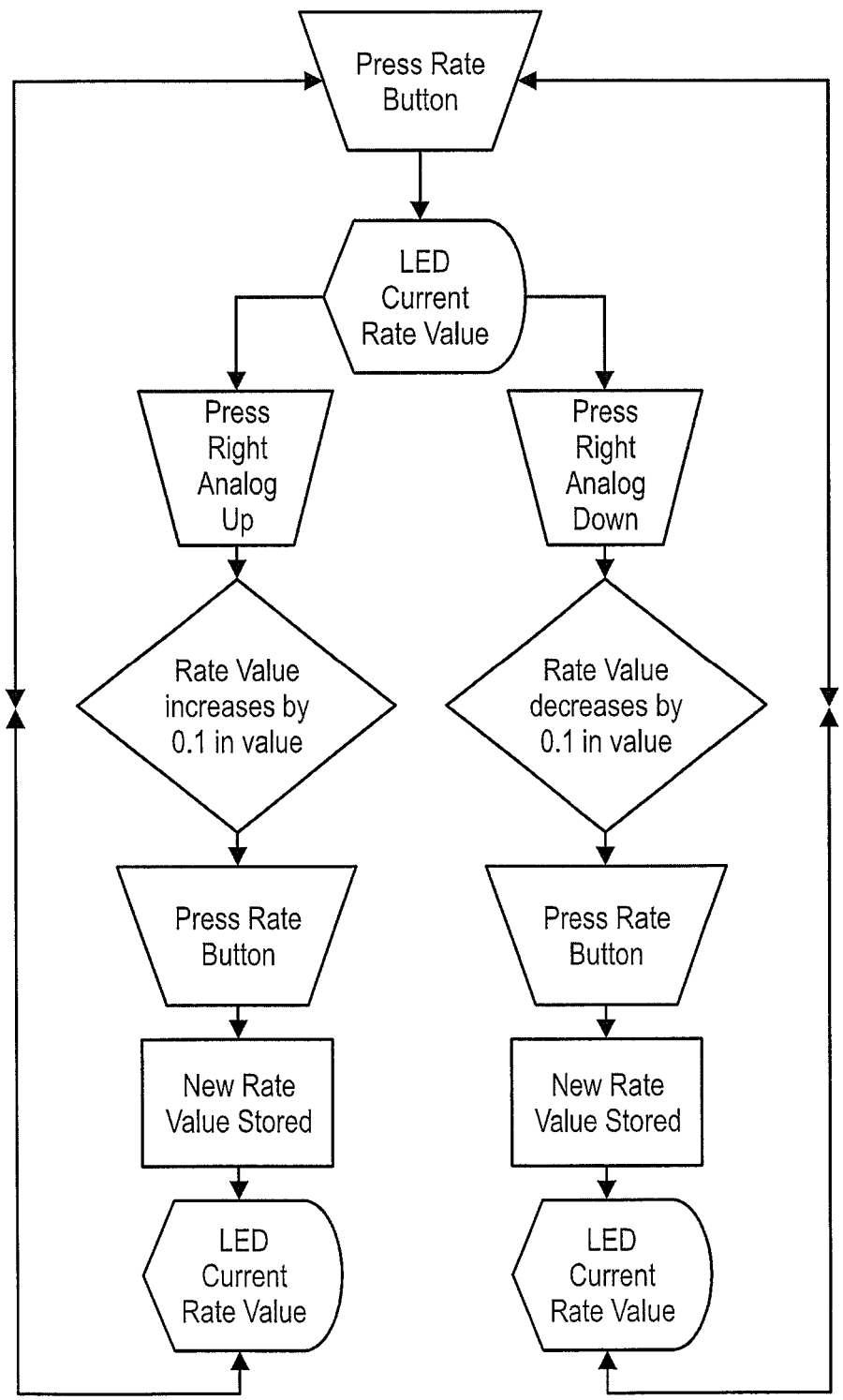
FIG. 3 shows a schematic flowchart of one embodiment of a method of adjusting shot rate.
Figure 4:
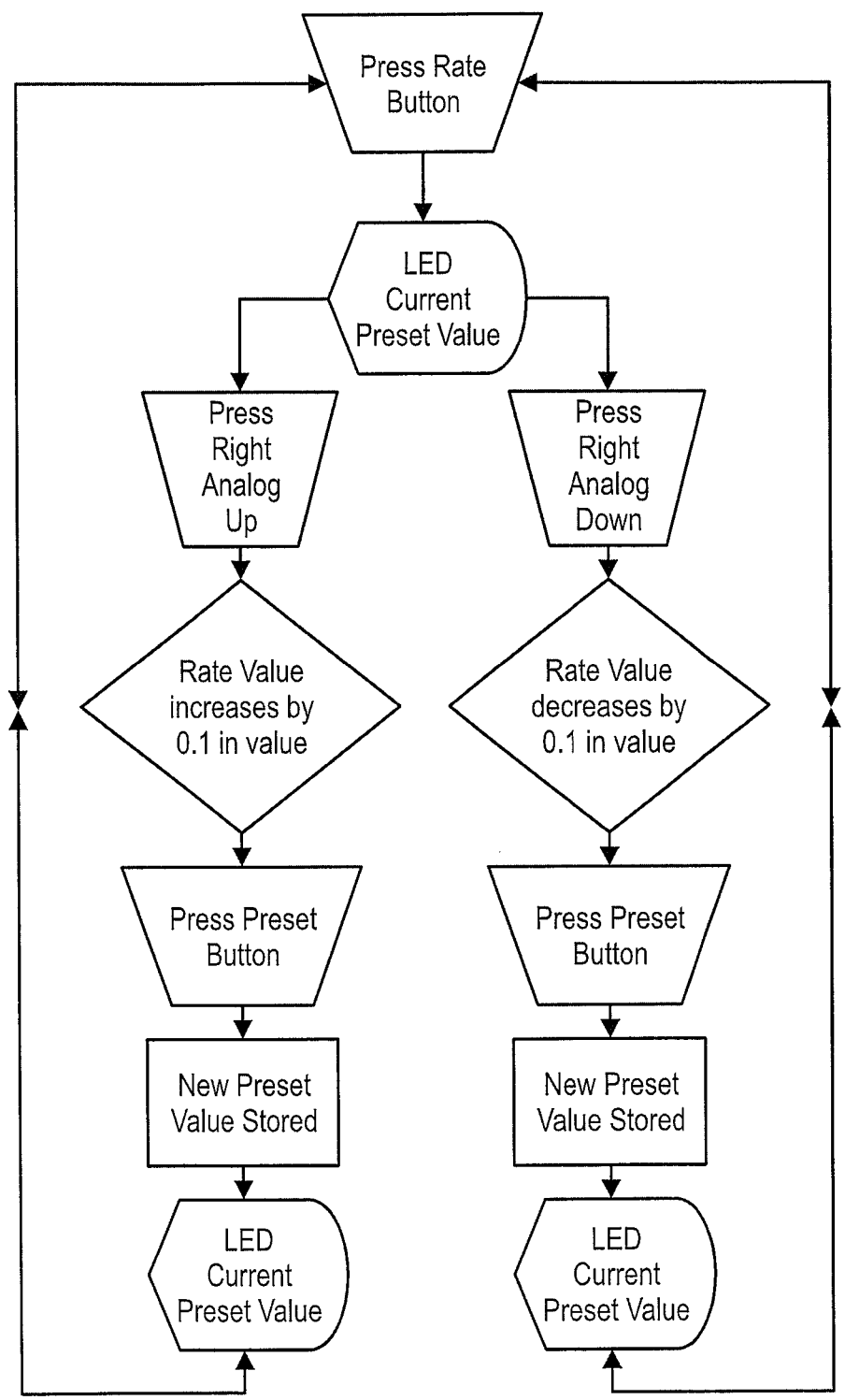
FIG. 4 shows a schematic flowchart of one embodiment of a method of setting preset shot rate values.

The shot rate adjustment component is responsive to user input. In one embodiment, a rate adjustment button (14) is provided. A single press of the rate adjustment button places the controller in rate adjustment mode. The user can then adjust the shot rate upwards or downwards using, for example, the right analog stick (16), and the shot rate value is shown in the display. Once the desired shot rate has been selected, pressing the rate adjustment button (14) stores the shot rate and exits the rate adjustment mode. The selected and stored shot rate is shown in the display (12). A schematic flowchart of one embodiment of the process is shown in FIG. 3.

In one embodiment, the shot rate can be adjusted in 0.1 shots per second increments, although any incremental value may be implemented.

In one embodiment, the shot rate adjustment component may allow a user to test fire the selected shot rate while still in rate adjustment mode.

The user preset component allows a user to quickly choose one of a plurality of preset shot rate values, and is also responsive to user input. In one embodiment, a preset button (18) is provided. A single press of the preset button places the controller in preset selection mode and the current preset selection, if any, is shown. A preset may be indicated with a code such as P01, P02 etc. In one embodiment, the display will alternate between the preset number and the shot rate which is stored in that preset. The user can then toggle through the stored presets using, for example, the right analog stick (16), and the preset number and shot rate is shown in the display. Once the desired preset is selected, another press of the preset button selects the desired preset.

A user can adjust the shot rate which is stored in a preset by pressing the preset button (18) to select preset selection mode, and toggle to the desired preset and adjust the preset shot rate value by, for example using the left analog stick (20) or any other control (22) which is responsive to adjust the shot rate value for that preset. As the shot rate is adjusted, the value may be shown in the display. Once the desired value is reached, another press of the preset button stores the adjusted shot rate value and exits the preset selection mode.

In another embodiment, the controller may have one or more light indicators which may switched to display different colors. The colors may be chosen to be indicative of selected modes of operation, or may be simply decorative. For example, the controller shown in FIG. 1 may have lighting on each of the analog thumbstick controls. A dedicated light button (20) may scroll between different light modes. For example, both thumbsticks may be set to show a solid green color, or an alternative color, or alternate between two or more colors, or flash colors in a predetermined sequence or randomly. In one embodiment, the colors may flash synchronously with the rapid fire shot rate. The current or selected color mode may be displayed in the display with a code such as C1, C2 etc.

In one embodiment, the controller may further comprise a component and a dedicated button to accomplish a task or action in the game. For example, in one embodiment, the controller may comprise an active reload component. In many video games, such as Gear of War, ammunition is limited, and periodic reloading is necessary. A dedicated active reload button may be provided which allows a user to choose and switch between active reload modes may be provided. In other examples, a dedicated bullet spray, drop shot or quick scope button may be provided to activate those actions in the Call of Duty game.

As will be apparent to those skilled in the art, various modifications, adaptations and variations of the foregoing specific disclosure can be made without departing from the scope of the invention claimed herein.

What is claimed is:

1. A rapid fire game controller, configured to be operatively connected to a game console or a computer operating game software, the controller comprising:
    (a) a rapid fire shot rate adjustment component for allowing a user to adjust or set the shot rate to a desired shot rate value, independently of a firing operation, and to store the desired shot rate value as a preset shot rate value;
    (b) a shot rate preset component for allowing the user to select one of a plurality of stored preset shot rate values; and
    (c) a display integrated with the controller for showing the user information about rapid fire shot rate and preset selection.

2. The game controller of claim 1 wherein the rapid fire shot rate adjustment component is operative in a shot rate adjustment mode to select a shot rate in increments of 0.1 shots per second, and wherein the shot rate is shown in the display.

3. The game controller of claim 1 wherein the shot rate preset component is operative in a preset selection mode to select one of a plurality of preset shot rate values, and wherein a preset identifier and the associated shot rate is shown in the display.

4. The game controller of claim 1 wherein the shot rate preset component is responsive to a user input to adjust the associated shot rate for any one preset shot rate value.

5. The game controller of claim 4 wherein the current shot rate is shown in the display as it is adjusted.

6. The game controller of claim 1 wherein the shot rate adjustment component allows a user to test fire at the selected shot rate while in shot rate adjustment mode.

7. A modification kit comprising a rapid fire module which comprises a shot rate adjustment component for allowing a user to adjust or set the shot rate to a preset shot rate value, independently of a fire operation, and to store the preset shot rate value, a shot rate preset component for allowing the user to select one of a plurality of preset shot rate values, and a display for showing the user information about rapid fire rate and preset selection, which kit may be used to modify an existing game controller.

* * * * *